(12) United States Patent
Berruet et al.

(10) Patent No.: US 11,168,739 B2
(45) Date of Patent: Nov. 9, 2021

(54) STRUCTURAL UNIT, UNIVERSAL JOINT BEARING AND ASSEMBLING PROCEDURE

(71) Applicant: Aktiebolaget SKF, Gothenburg (SE)

(72) Inventors: Nicolas Berruet, Artannes sur Indre (FR); Helmut Hauck, Euerbach (DE); Hubert Herbst, Gädheim (DE); Daniel Jansen, Schwebheim (DE); Suhel Ahamad Khan, Jabalpur (IN); Manfred Mattes, Kolbingen (DE); Fabio Picatto, Turin (IT); Marcel Schmitt, Burkardroth (DE); Hector Villalobos, Shanghai (CR)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 16/821,411

(22) Filed: Mar. 17, 2020

(65) Prior Publication Data
US 2020/0370604 A1   Nov. 26, 2020

(30) Foreign Application Priority Data
May 24, 2019   (IN) ............................. 201941020727

(51) Int. Cl.
| F16C 33/78 | (2006.01) |
| F16D 3/38 | (2006.01) |
| F16C 33/74 | (2006.01) |
| F16C 17/02 | (2006.01) |
| F16D 3/40 | (2006.01) |

(52) U.S. Cl.
CPC .............. *F16D 3/385* (2013.01); *F16C 17/02* (2013.01); *F16C 33/74* (2013.01); *F16C 33/7809* (2013.01); *F16C 33/7886* (2013.01); *F16C 2361/41* (2013.01); *F16D 3/40* (2013.01); *F16D 2250/0084* (2013.01); *F16D 2300/08* (2013.01)

(58) Field of Classification Search
CPC .... F16C 19/46; F16C 21/005; F16C 33/7876; F16C 33/7809; F16C 33/7886; F16C 2361/41; F16C 3/385; F16C 3/40; F16C 3/41; F16C 2250/0084; F16C 2300/08
See application file for complete search history.

(56) References Cited

U.S. PATENT DOCUMENTS

| 5,588,915 A | * | 12/1996 | Smith | F16C 21/005 |
| | | | | 464/131 |
| 5,716,277 A | * | 2/1998 | Reynolds | F16C 33/7809 |
| | | | | 464/131 |
| 6,050,571 A | * | 4/2000 | Rieder | F16C 21/005 |
| | | | | 277/353 |

(Continued)

FOREIGN PATENT DOCUMENTS

| CN | 100588850 C | 2/2010 |
| CN | 105317847 A | 2/2016 |

(Continued)

*Primary Examiner* — Phillip A Johnson
(74) *Attorney, Agent, or Firm* — Garcia-Zamor Intellectual Property Law; Ruy Garcia-Zamor; Bryan Peckjian

(57) ABSTRACT

A structural unit for assembly to a trunnion of a universal joint bearing providing a cup, a sealing ring, which is fixed to the cup, and a shield, which is connected to the cup in a state in which the structural unit is not assembled to the trunnion. The cup includes a bottom and the sealing ring provides at least one sealing lip that points in a direction with an axial component towards the bottom.

12 Claims, 3 Drawing Sheets

(56) References Cited

U.S. PATENT DOCUMENTS

| | | | | |
|---|---|---|---|---|
| 6,050,899 | A * | 4/2000 | Jones | F16D 3/385 |
| | | | | 277/565 |
| 6,095,925 | A * | 8/2000 | Smith | F16D 3/385 |
| | | | | 464/131 |
| 6,357,754 | B1 * | 3/2002 | Rieder | F16C 21/005 |
| | | | | 277/394 |
| 6,406,373 | B1 * | 6/2002 | Gibson | F16D 3/385 |
| | | | | 464/131 |
| 10,570,965 | B2 | 2/2020 | Khan et al. | |
| 2006/0125189 | A1 * | 6/2006 | Peschke | F16D 3/385 |
| | | | | 277/349 |
| 2007/0049381 | A1 * | 3/2007 | Eversole | F16D 3/385 |
| | | | | 464/130 |
| 2008/0131044 | A1 * | 6/2008 | Bauer | F16C 19/46 |
| | | | | 384/486 |
| 2009/0011841 | A1 * | 1/2009 | Wang | F16C 17/08 |
| | | | | 464/14 |
| 2017/0082153 | A1 * | 3/2017 | Hess | F16D 3/385 |

FOREIGN PATENT DOCUMENTS

| | | | | |
|---|---|---|---|---|
| DE | 102014215000 A1 | 2/2016 | | |
| DE | 102017205270 A1 | 9/2018 | | |
| DE | 102018207056 A1 | 11/2018 | | |
| JP | 01193412 A * | 8/1989 | | F16D 3/385 |
| JP | 2000009152 A * | 1/2000 | | F16C 33/7809 |

* cited by examiner

STRUCTURAL UNIT, UNIVERSAL JOINT BEARING AND ASSEMBLING PROCEDURE

CROSS-REFERENCE TO RELATED APPLICATIONS

This application claims priority to Indian Patent Application no. IN201941020727, filed May 24, 2019, the contents of which is fully incorporated herein by reference.

FIELD OF THE INVENTION

The present invention relates to a structural unit for assembly to a trunnion of a universal joint bearing. In particular, the present invention relates to a structural unit for assembly to a trunnion of a universal joint bearing having a sealing ring that includes at least one sealing lip.

BACKGROUND OF THE INVENTION

From the patent application DE 10 2018 207 056 A1 a universal joint bearing is known which comprises a cup, a sealing ring and a shield. The sealing ring and the shield are fixed to the cup in a fully assembled state.

SUMMARY OF THE INVENTION

A structural unit for assembly to a trunnion of a universal joint bearing comprising a cup, a sealing ring, which is fixed to the cup, and a shield, which is connected to the cup in a state in which the structural unit is not assembled to the trunnion, is suggested, wherein the cup comprises a bottom and the sealing ring comprises at least one sealing lip which points in a direction with an axial component pointing towards the bottom. Accordingly an increased efficiency can be achieved. In particular it can be accomplished that with the structural unit a universal joint bearing can be assembled very cost efficiently especially because the structural unit can be fixed to a trunnion of the universal joint bearing by only pushing the structural unit onto the trunnion. Furthermore, it can be achieved in particular that with the help of the sealing lip grease which is contained initially in the universal joint bearing is retained there for all time so that it is not necessary to re-grease the universal joint bearing, which is a clear advantage over existing universal joint bearings.

Advantageously the cup comprises a region which is located at an axial end of the cup and which is spaced as far away from a central axis of the cup, which intersects the bottom, as a region of the shield. Thereby the universal joint bearing can be assembled easily. In particular a force can be exerted from the cup on the sheet along the axial direction easily.

Furthermore, a universal joint bearing comprising a structural unit is suggested.

Preferably the shield is directly fixed at a trunnion of the universal joint bearing, whereby only a small number of assembly steps are needed.

Advantageously, the sealing ring comprises exactly one metal ring and/or exactly one elastomeric ring. By this a simple and still effective construction style can be attained. Moreover, it is suggested that the elastomeric ring encompasses one or both ends of the metal ring in an axial section. Thereby a very reliable sealing of the universal joint bearing can be achieved. Furthermore, a simple way of fixation of the shield to the cup can be attained.

Advantageously an elastomeric ring of the sealing ring contacts the shield at a radially inner surface of the shield and/or at a surface of a portion of the shield which extends in an axial section mainly radially. By this an early blockade of intruding dust is accomplished.

Preferably the sealing ring comprises a metal ring which is essentially S-shaped in an axial section and the shape of the metal ring in the axial section is built by two end limbs and one intermediate limb and at least one of the end limbs comprises a tip which is bent parallelly to the intermediate limb towards the other end limb. Thereby a reliable fixation of an elastomeric part of the sealing ring to a metal ring of the sealing ring is attained.

In a favoured embodiment of the invention a first sealing lip of the sealing ring contacts a radially outer surface of the trunnion in a region which is a straight extension of a raceway of the trunnion for rolling elements of the universal joint bearing or the first sealing lip of the sealing ring has a maximal distance of 0.8 mm from the radially outer surface of the trunnion in the region which is a straight extension of a raceway of the trunnion for rolling elements of the universal joint bearing. Through this construction space in the axial direction is saved, in particular for a step between the raceway and the radially outer surface of the trunnion.

Preferably the shield is essentially S-shaped in an axial cross section.

In a favoured embodiment of the invention the universal joint bearing comprises a spring which contacts a front face of a metal ring and rolling elements of the universal joint bearing.

Preferably a first sealing lip of the universal joint bearing contacts a first radially outer surface of the trunnion or has a maximal distance of 1 mm, preferably 0.8 mm, to the first radially outer surface of the trunnion and a second sealing lip of the universal joint bearing contacts a second radially outer surface of the trunnion and between the first and second radially outer surfaces there is at least one step of the trunnion.

Advantageously between a contact region of the shield and the trunnion and a contact region between a sealing lip of the universal joint bearing contacting the trunnion next to the shield there is at least one step of the trunnion.

Moreover, an assembling procedure for a universal joint bearing, in particular for a universal joint bearing as described above, is suggested, during which a structural unit comprising a cup, a sealing ring, which is fixed to the cup, and a shield, which is connected to the cup in a state in which the structural unit is not assembled to a trunnion of the universal joint bearing, wherein the cup comprises a bottom and the sealing ring comprises at least one sealing lip which points in a direction with an axial component pointing towards the bottom, is pushed on the trunnion. Through this an increased efficiency, in particular concerning the assembly of the universal joint bearing, can be achieved.

BRIEF DESCRIPTION OF THE DRAWINGS

Further advantages result from the following drawing description. Embodiments of the invention are shown in the drawings. The drawings, the description and the claims contain numerous features in combination. The person skilled in the art will expediently also consider the features individually and combine them into meaningful further combinations.

DETAILED DESCRIPTION OF THE INVENTION

Figure 1:
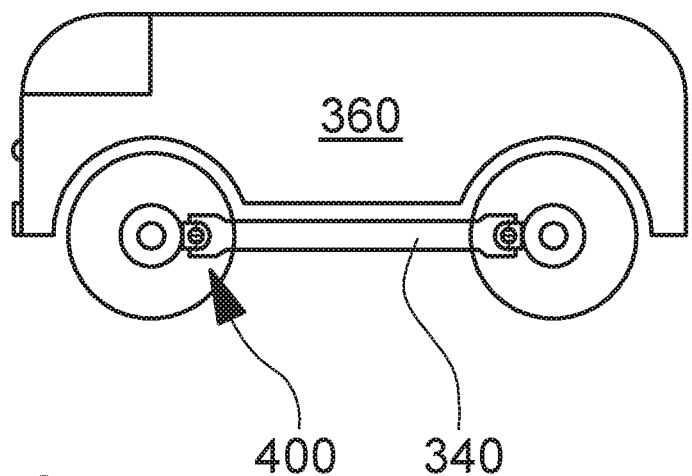
FIG. 1 shows a motor vehicle comprising a universal joint with a universal joint bearing according to the invention.
Figure 2:
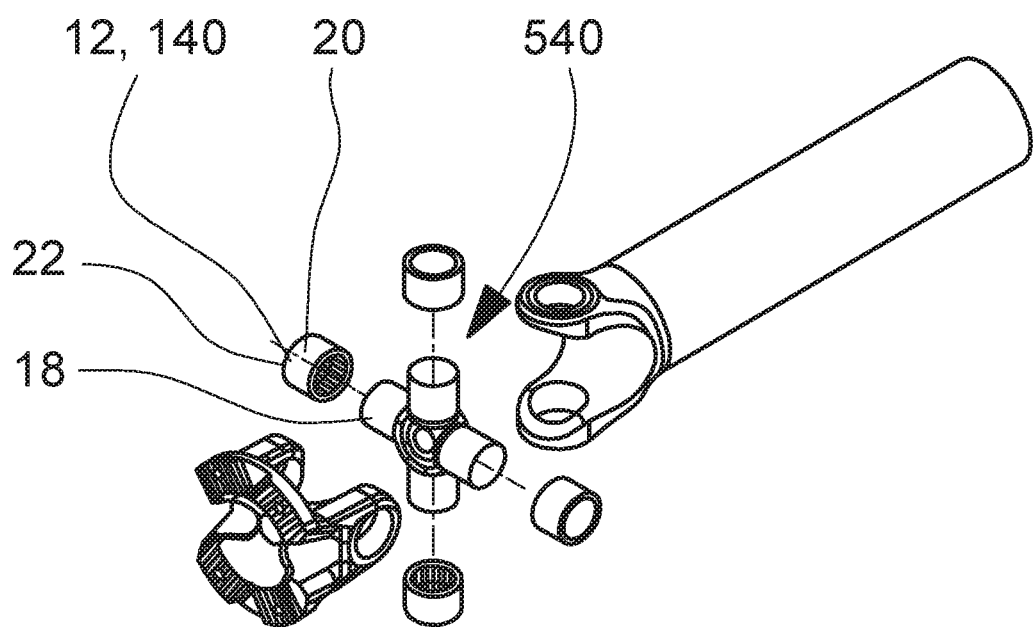
FIG. 2 shows the universal joint in an explosion view.

FIG. 1 shows a motor vehicle 360 comprising a universal joint 400 with a universal joint bearing 20 according to the invention and a crosspiece 540 of the universal joint (FIG. 2). The motor vehicle is a truck. The universal joint is connected to a propeller shaft 340 of the truck. A trunnion 18 of the crosspiece serves as an inner ring for the universal joint bearing. Furthermore, the universal joint bearing comprises a cup 12, which serves as an outer ring 140 of the universal joint bearing. The universal joint bearing has a sealing ring 14 (FIGS. 3 and 4), which seals a gap between the cup and the trunnion. The universal joint bearing and the sealing ring are free from spiral springs.

Figure 3:
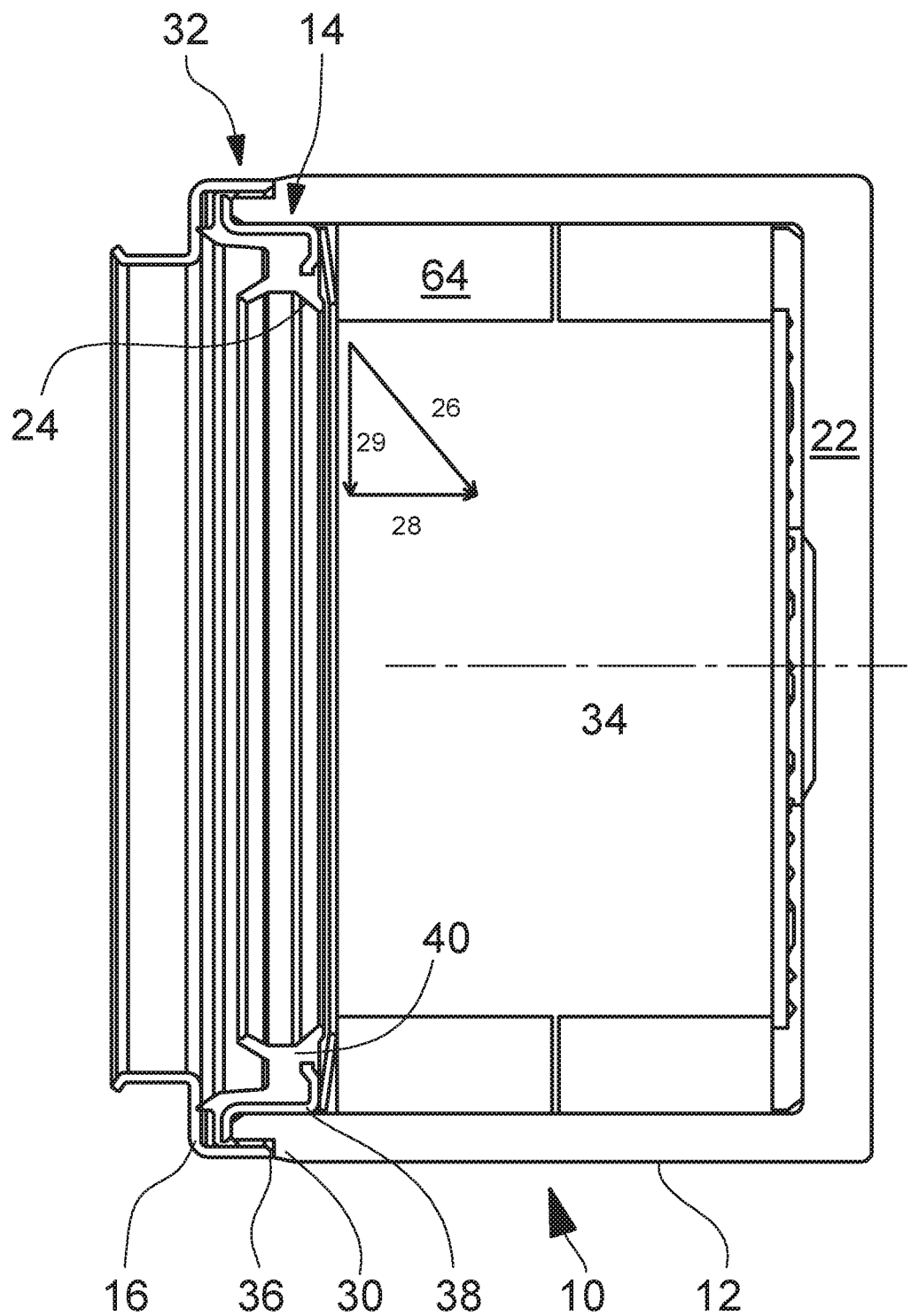
FIG. 3 shows a axial section through a structural unit of the universal joint bearing according to the invention.

FIG. 3 shows an axial section through a structural unit 10 according to the invention. The structural unit 10 is in a fully assembled condition a part of the universal joint bearing 20. FIG. 3 shows the structural unit 10 in which the structural unit 10 is not assembled to the trunnion 18. The structural unit 10 comprises the cup 12 and a sealing ring 14, which is fixed to the cup 12. More specifically a metal ring 38 of the sealing ring 14 is friction locked to a radially inner surface of the cup 12. In the state, in which the structural unit 10 is not assembled to the trunnion 18, a shield 16 of the structural unit is indirectly connected to the cup 12. Furthermore, the sealing ring 14 comprises an elastomeric ring 40. The universal joint bearing 20 comprises only one sealing ring, which is the sealing ring 14. The sealing ring 14 consists of the metal ring 38 and the elastomeric ring 40.

The elastomeric ring 40 comprises a sealing lip 24, which points in a direction 26 (FIG. 3). The direction 26 has an axial component 28 and a radial component 29. The axial component 28 points towards a bottom 22 of the cup 12. When the structural unit is assembled to the trunnion 18 this means that grease, which is inside the bearing and moves away from rolling elements 64 of the universal joint bearing towards the sealing lip 24 presses against the sealing lip 24 and through this pressing the sealing effect of the sealing lip 24 is enhanced. Because of this enhancement the grease cannot get past the sealing lip 24 and outside the universal joint bearing.

Furthermore, the cup 12 comprises a central axis 34 which intersects the bottom 22. The cup comprises a region 30 which is located at an axial end 32 of the cup and which is spaced as far away from the central axis 34 as a region 36 of the shield (FIG. 3). When the structural unit 10 is assembled to the trunnion 18 the shield is therefore easily fixed directly on the trunnion by pushing the shield onto the trunnion through exerting a axial force onto the shield with the help of the cup 12. When the shield is pushed onto the trunnion 18 the shield 16 is friction-locked to the trunnion 18.

The elastomeric ring 40 is moulded onto the metal ring 38. In the described configuration the elastomeric ring 40 is more specifically compression moulded onto the metal ring 38. It encompasses a first end 42 and a second end 44 of the metal ring 38, in particular viewed in an axial section. The sealing ring comprises a metal ring which is essentially S-shaped in an axial section (FIG. 4) and the shape of the metal ring in the axial section is built by two end limbs 50, 52 and one intermediate limb 54. The end limb 52 comprises a tip 56 which is bent parallelly to the intermediate limb towards the other end limb 50.

Moreover, the elastomeric ring 40 comprises a second sealing lip 66, which abuts against a further radially outer surface of the trunnion. Between this further radially outer surface and a surface 60 a step of the trunnion is located, so that the further radially outer surface is farer away from the central axis 34 than the surface 60. The sealing lip 24 abuts against the surface 60. In other embodiments of the invention the sealing lip 24 does not contact the surface 60 but has a maximal distance of 0.8 mm from it.

The radially outer surface 60 of the trunnion is in a region which is a straight extension of a raceway 62 of the trunnion for rolling elements 64 of the universal joint bearing. The shield 16 is friction locked at radially outer surface 70 of the trunnion 18. Between the surface 70 and the above-mentioned further radially outer surface, against which the sealing lip 66 abuts, there is further step of the trunnion located, which means that the surface 70 is located farer away from the central axis 34 than the further radially outer surface.

The elastomeric ring 40 of the sealing ring contacts the shield at a radially inner surface 46 of the shield. Through this the shield is friction locked to the sealing ring and thereby to the cup 12 but it also causes a sealing effect between the cup 12 and the shield 16. Another sealing lip 68 of the elastomeric ring 40 points mainly in an axial direction and abuts against a surface 48 of a portion of the shield which extends in an axial section radially and in a circumferential direction.

The plate spring 72 of the structural unit 10 is located between the sealing ring 14 and the rolling elements 64 and abuts against both of them. More specifically the plate spring touches the limb 52 of the metal ring. In alternative embodiments of the invention there is a part of the elastomeric ring 40 located between the limp 52 and the plate spring. This part can have a thickness of up to 1 mm Because the plate spring touches the limb 52 directly or, for other embodiments, the mentioned part has only a small thickness, the pressure of the plate spring towards the rolling elements 64 is quite precisely defined, so that less tilting of the rolling elements 64 and through this a longer service life and better performance is achieved.

The sealing lips 66, 68 have a different orientation as the sealing lip 24, which means that they are not directed against preventing that the grease of the universal joint bearing leaks to the outside but they are oriented such that their purpose is to prevent the intrusion of environmental pollution and dust from the outside into the bearing. The shield provides a very strong first barrier against heavy pollution like bigger particles, stones, sand, rocks etc. as well as against accidental damages. The shield has a maximum outer diameter smaller than the maximum outer diameter of the cup, which facilitates the assembling of the universal joint.

Because the universal joint bearing comprises only one sealing ring the axial length of the sealing ring inside the cup is small, especially compared to other universal joint bearings. Consequently either the total length of the universal joint bearing is reduced, so that also the mass of the universal joint bearing is reduced, or by keeping the initial length of the universal joint bearing the same as the length known from the prior art the rolling elements 64 can be made larger than the ones known from the prior art so that the load capacity of the universal joint bearing is increased.

The elastomeric ring 40 is made from rubber or thermoplastic material or the like. The shield can be made from a metal or a polymer.

In other embodiments of the invention the elastomeric ring 40 comprises one or more than one bore for deaeration which lead from a space 76, in which the plate spring 72 is located, to a space 78, which is located between the sealing lip 66 and the sealing lip 24.

Alternatively or additionally the elastomeric ring 40 can comprise one or more than one bore for deaeration which lead from the space 76 to a space 80, which is located between the sealing lip 66 and the sealing lip 68.

Figure 4:
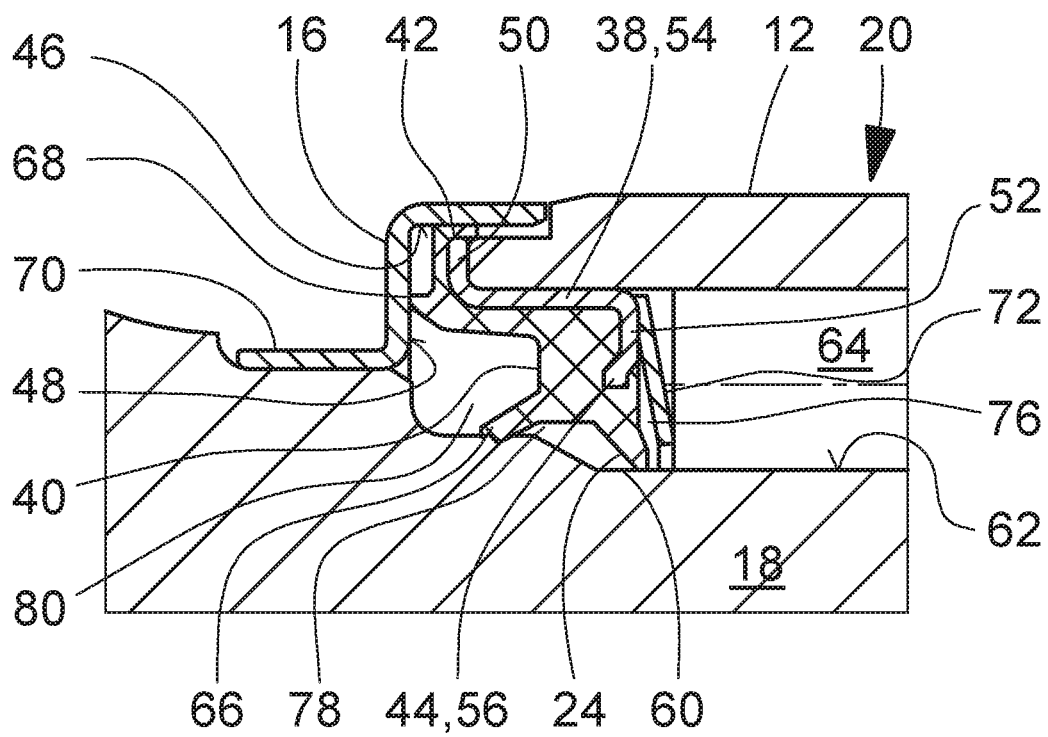
FIG. 4 shows an axial section through a region of the universal joint bearing with a part of the structural unit and a part of a trunnion.
Figure 5:
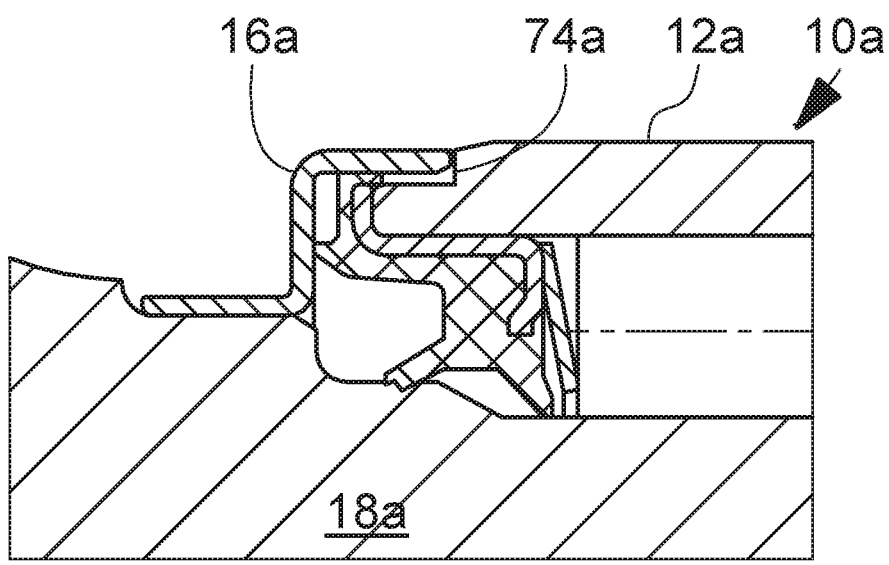
FIG. 5 shows an axial section through an alternative embodiment of a structural unit according to the invention, which is assembled on a trunnion.

An alternative embodiment is shown in FIG. 5. Essentially the same components, features and functions are always given the same reference numerals. However, in order to differentiate the exemplary embodiments, the letter "a" is added to the reference numerals of the exemplary embodiments in FIG. 5. The following description is essentially limited to the differences from the exemplary embodiment in FIGS. 1 to 4, wherein references can be made to the description of the exemplary embodiment in FIGS. 1 to 4 with respect to the components, features and functions which remain the same.

FIG. 5 shows analogously to FIG. 4 an axial section through a structural unit 10a according to the invention which is already assembled on a trunnion 18a so that a universal joint bearing is built. The only difference of the universal joint bearing shown in FIG. 5 and the one described in the FIGS. 1 to 4 is that a plastic ring 74a is inserted between the shield 16a and the cup 12a. When the universal joint bearing is used, movements between the cup and the shield can occur and the plastic ring 74a prevents that during these movements the shield contacts the cup. Thus the plastic ring 74a has a function of an element of a plain bearing. In other embodiments of the invention the ring 74a can be a coated metal or a soft metal.

The invention claimed is:

1. A structural unit for assembly to a trunnion of a universal joint bearing, the structural unit comprising:
    a cup,
    a sealing ring fixed to the cup,
    a metal ring disposed on the sealing ring and having a first end,
    a shield connected to the cup in a state in which the structural unit is not assembled to the trunnion,
        the cup comprises a bottom and, on an opposite axial cup side, a radially extending axial portion,
        the sealing ring comprises a first end and at least one sealing lip that points in a direction with an axial component pointing towards the bottom; and
        wherein the first end of the metal ring and the radially extending portion of the cup abut a first side of a portion of the sealing ring; the shield abutting a second side, opposite from the first side, of the portion of the sealing ring.

2. The structural unit according to claim 1, wherein the cup comprises a region located at an axial end of the cup and which is spaced as far away from a central axis of the cup, which intersects the bottom, as a region of the shield a central axis which intersects the bottom, the cup further comprises a region which is located at an axial end of the cup and spaced as far away from the central axis as a region of the shield.

3. The structural unit according to claim 1, wherein the elastomeric ring also contacts an axially extending portion of the shield.

4. The structural unit according to claim 1, wherein a portion of the shield extends axially outwardly from the cup past the opposite axial cup side such that the portion of the shield is configured to engage the trunnion.

5. A universal joint bearing comprising:
    a structural unit for assembly to a trunnion of a universal joint bearing, the structural unit comprising:
        a cup,
        a sealing ring fixed to the cup, and
        a shield connected to the cup in a state in which the structural unit is not assembled to the trunnion, wherein
        the cup comprises a bottom, and wherein
        the sealing ring comprises at least one sealing lip that points in a direction with
    an axial component pointing towards the bottom, wherein an elastomeric ring of the sealing ring contacts the shield at a radially inner surface of the shield.

6. The universal joint bearing according to claim 5, wherein the shield is directly fixed at the trunnion of the universal joint bearing.

7. The universal joint bearing according to claim 5, wherein the sealing ring comprises exactly one metal ring and/or exactly one elastomeric ring.

8. The universal joint bearing according to claim 7, wherein the elastomeric ring encompasses one or both ends of the metal ring in an axial section.

9. The universal joint bearing according to claim 5, wherein the elastomeric ring also contacts an axially extending portion of the shield an elastomeric ring of the sealing ring contacts the shield at a radially inner surface of the shield and/or at a surface of a portion of the shield which extends in an axial section mainly radially.

10. An assembly procedure for a universal joint bearing, in particular for a universal joint bearing according to claim 5, wherein the cup comprising the bottom and the sealing ring comprising the at least one lip is pushed onto the trunnion.

11. A universal joint bearing comprising:
    a structural unit for assembly to a trunnion of a universal joint bearing, the structural unit comprising:
        a cup,
        a sealing ring fixed to the cup, and
        a shield connected to the cup in a state in which the structural unit is not assembled to the trunnion, wherein
        the cup comprises a bottom, and wherein
    the sealing ring comprises at least one sealing lip that points in a direction with an axial component pointing towards the bottom, The universal joint bearing according to claim 5, wherein the sealing ring comprises a metal ring that, when viewed in cross-section, has an S-shape is S-shaped in an axial section and the shape, the S-shape of the metal ring in the axial section is built formed by two end limbs and one intermediate limb, and wherein at least one of the two end limbs comprises a tip that is bent parallelly to the intermediate limb towards the other end limb.

12. A universal joint bearing comprising:
    a structural unit for assembly to a trunnion of a universal joint bearing, the structural unit comprising:
        a cup,
        a sealing ring fixed to the cup, and a shield connected to the cup in a state in which the structural unit is not assembled to the trunnion, wherein
the cup comprises a bottom, and wherein
the sealing ring comprises at least one sealing lip that points in a direction with an axial component pointing towards the bottom, The universal joint bearing according to claim 5, wherein a first sealing lip of the sealing ring contacts a radially outer surface of the trunnion in a region that is a straight extension of a raceway of the trunnion for rolling elements of the universal joint bearing, or the first sealing lip of the sealing ring has a maximal distance of one millimeter (1 mm) 1 mm, preferably 0.8 mm, from the radially outer surface of the trunnion in the region that is a straight extension of a raceway of the trunnion for rolling elements of the universal joint bearing.

* * * * *